VOLTAGE CONTROLLED FREQUENCY MODULATED OSCILLATOR
Filed Oct. 7, 1955
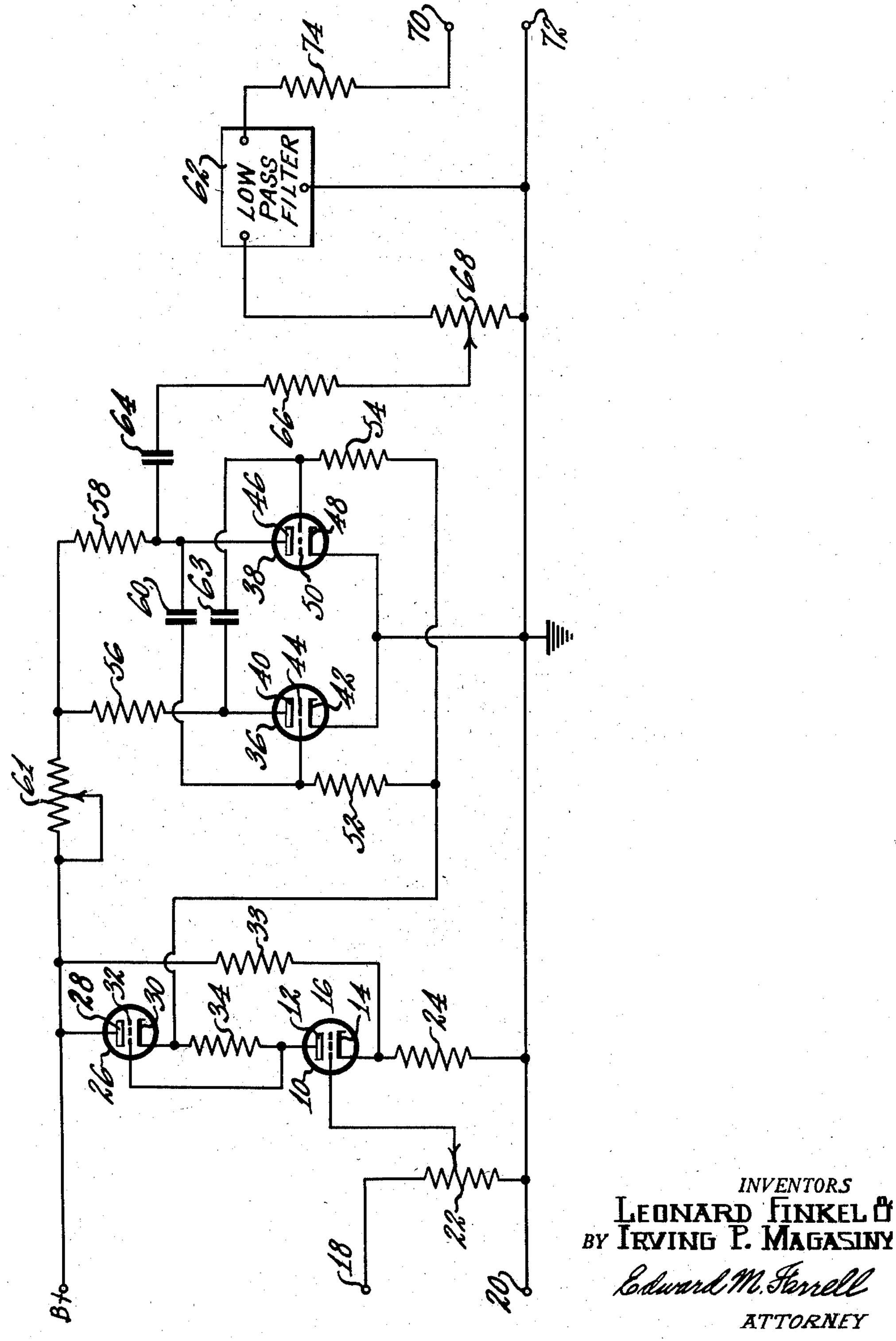
INVENTORS
LEONARD FINKEL &
BY IRVING P. MAGASINY
Edward M. Farrell
ATTORNEY

United States Patent Office 2,863,122

Patented Dec. 2, 1958

2,863,122

VOLTAGE CONTROLLED FREQUENCY MODULATED OSCILLATOR

Leonard Finkel, Haddonfield, N. J., and Irving P. Magasiny, Philadelphia, Pa., assignors to Tele-Dynamics Inc., a corporation of Pennsylvania Application October 7, 1955, Serial No. 539,119

1 Claim. (Cl. 332—16)

This invention relates to oscillator circuits and, more particularly to means for frequency modulating such oscillators.

In many types of telemetric systems associated with guided missiles, pilotless aircrafts or projectiles, for example, recordations or measurements of acceleration, temperature, pressure, current and other variable quantities are often necessary. In such systems, a plurality of pickups is often used to convert the variable quantities into corresponding electrical signals which are used to frequency modulate a sub-carrier oscillator. The output voltages from the sub-carrier oscillators are combined by suitable circuit means and applied to a modulator circuit of a radio transmitter which, in turn, excites a transmitting antenna.

The transmitted signal is recovered by a receiver, which may be on the ground or at another remote point, which converts the transmitted signal into a composite sub-carrier voltage. Band-pass filters are then used to separate the individual sub-carrier voltages from the composite voltage. Each filtered sub-carrier voltage is then applied to an individual sub-carrier frequency discriminator which produces a varying direct current output voltage.

In many cases, the electrical signals originating at the pickups or transducers are not of sufficient amplitude to drive the sub-carrier oscillators within a telemetering system. In such cases, D. C. amplifiers or other type converters are generally employed between the pickups and the oscillators. The amplifiers, which may be regarded as modulators, must be stable in operation and not subject to changes in filament voltages or other operating voltages. Stable amplifiers or modulators are necessary to prevent undesired modulation of an associated sub-carrier oscillator. Modulation of a sub-carrier oscillator by variations in operational voltages results in the transmission of false information decreasing the reliability and accuracy of the telemetering system.

Various forms of heater voltage and B+ voltage compensation arrangements have been used heretofore. Such arrangements, while satisfactory in most respects, have often involved complicated circuitry or have employed an unusually large number of elements. Such arrangements have generally been restricted to D. C. heater compensation methods and not useful A. C. heater compensation. As the art of telemetering progresses, the demands for equipment of decreased size, greater accuracy and ruggedness have also correspondingly increased requiring the elimination of unnecessary components and parts.

It is an object of this invention to provide an improved modulator circuit having compensation for operational voltage variations.

It is a further object of this invention to provide an improved sub-carrier oscillator circuit having low non-linearity characteristics.

It is still a further object of this invention to provide an improved modulator circuit having a relatively high output load impedance for amplification purposes and a relatively low impedance for coupling purposes.

It is still a further object of this invention to provide an improved oscillator modulator circuit wherein the linearity of the oscillator is relatively independent of the means for providing filament voltage compensation for the modulator.

It is still a further object of this invention to provide an improved modulator circuit having compensation means for both A. C. and D. C. heater variations as well as for B+ voltage variations.

In accordance with the present invention, an oscillator circuit is adapted to be modulated by a source of modulating signals. A D. C. amplifier, comprising a triode vacuum device, has a second triode device serially connected in its space current path. The second triode device provides a relatively high output impedance for the first triode as well as providing means for compensating for variations in filament and B+ voltage. The cathode of said second triode device is connected to the oscillator circuit. This connection provides a relatively low impedance for the oscillator circuit.

Other objects and advantages of the present invention will suggest themselves to those skilled in the art to which the invention is related from a reading of the following specification in association with the accompanying drawing.

The single figure of the drawing is a schematic representation of a modulator-oscillator circuit embodying the present invention.

Referring to the sole figure of the drawing, a D. C. amplifier comprises a triode electrode discharge device 10 having an anode 12, a cathode 14 and a control grid 16. A source of signal voltage may be connected to a pair of input terminals 18 and 20 across a potentiometer 22 which controls the amplitude of the signal voltage applied to the D. C. amplifier. A resistor 24 is connected between the cathode 14 and a point of reference potential, designated as ground.

A second triode electron discharge device 26 with characteristics similar to triode device 10 is serially connected in the space current path of the device 10 and comprises an anode 28, a cathode 30 and a control grid 32. A resistor 34 is connected between the cathode 30 and the anode 12. A source designated as B+ supplies the operating potentials for the devices 10 and 26. A compensating resistor 33 is connected between B+ and the cathode 14.

An oscillator circuit, shown in the form of a multivibrator circuit, comprises a pair of triode electron discharge devices 36 and 38. The device 36 includes an anode 40, a cathode 42 and a control grid 44. The device 38 includes an anode 46, a cathode 48 and a control grid 50.

The cathode 30 of the device 26 is connected to the control grids 44 and 50 through resistors 52 and 54, respectively. The anodes 40 and 46 are connected to B+ through resistors 56 and 58, respectively. The cathodes 42 and 48 are connected to ground. The anode 46 is coupled to the control grid 44 through a capacitor 60 and the anode 40 is coupled to the control grid 50 through a capacitor 63. Means for adjusting the voltages at the anodes 40 and 46 is provided by a single or common potentiometer 61 connected between the anodes and B+.

The output voltages from the multivibrator circuit is applied from the anode 46 to a low pass filter, represented by a block 62, through a coupling network including a capacitor 64, a resistor 66 and a potentiometer 68. The output voltage from the low pass filter is applied to a pair of output terminals 70 and 72 through a resistor 74.

In considering the operation of the circuit shown, the source of signal voltage applied to the input terminals 18 and 20 may be from a pickup or transducer used to measure a variable quantity, such as speed or pressure associated with an element in a guided missile or other aircraft. The signal voltage is used to produce a corresponding frequency change in the oscillator circuit including the triode devices 36 and 38.

Since the voltage from the pickup is generally a direct current voltage and is usually not sufficient in amplitude to directly drive an oscillator circuit over the required frequency excursion, a D. C. amplifier including the triode device 10 is employed to amplify the signal voltage from the pickup. D. C. amplifiers are adversely affected by variations in operational voltages, especially variations in heater voltages. In the circuit shown, variations in the operational voltages of the D. C. amplifier will produce variations or modulation of the oscillator circuit. The frequency variation of the oscillator, in such a case, does not correspond to the signal or information voltage from the pickup. Inaccuracies are thereby introduced into the system. For this reason, means for compensating for variations in operational voltages associated with the D. C. amplifier must generally be employed.

To provide compensation for such variations in operational voltages, the triode device 26 is serially connected in the space current path of the device 10. A series D. C. amplifier, such as the one illustrated, provides a circuit relatively insensitive to supply variations provided that the values of the cathode resistors 24 and 34 are properly chosen.

The filaments or heaters of the devices 10 and 26 may be connected in series or in parallel. When the filament voltage of the device 10 increases, the voltages at the cathodes 14 and 30 increase due to the increased current in the devices 10 and 26. In the absence of compensation for these variations, the frequency of the oscillator comprising the devices 36 and 38 will vary. To compensate for an increase in filament voltage, it is seen that the device 26 may be considered as a form of variable resistor. The resistance of the device 26 decreases when the current therethrough increases. As the plate resistance of the device 26 decreases, the voltage of the cathode 14 decreases thereby compensating for the increase in voltage caused by the increase in filament voltage. When the filament voltage decreases, compensation is provided in a similar manner. The decrease in the voltage at the cathode 14 is counteracted by an increase in the voltage at the cathode resulting from the increased plate resistance of the device 26.

It is seen that if the potentiometer 22 is adjusted to ground that the circuits associated with the devices 10 and 26 will be substantially identical. If a connection between the anode 12 and the oscillator circuit were employed instead of from the cathode 30, as shown, the amplifier compensation attained would be extremely good since it may be considered equivalent to a symmetrical voltage divider network with a center tap connection which would provide equal voltage drops across each of the devices 10 and 26. The compensation attained with the connection as shown is slightly disturbed since the symmetrical voltage divider network including the devices 10 and 26 is not employed. However, since the effect of the resistor 34 is slightly compared to the effect of the device 26, the disturbance of the network is not too great and may be counteracted to a great extent through the proper choice of the cathode resistors. The connection from the cathode, as shown, is desirable as will be seen.

In the telemetering systems, it is necessary that extremely linear amplifiers be employed, since non-linearity introduces inaccuracies into a system or necessitates additional means for compensating for such non-linearity. In vacuum tubes, it is generally true that the higher the ohmic value of the load, the straighter will be the dynamic transfer characteristic of the tube for a specified output voltage range. As the ohmic value of the load increases, the overall characterisc approaches a straight line; that is, it becomes more and more linear throughout its length.

A practical difficulty encountered in increasing the ohmic value of a load is that the source of operating potential must generally be increased if proper operating voltage is to be supplied to a tube. In the present invention, the device 26 offers a very high variational load impedance in the plate circuit of the device 10. The high plate load assures substantially linear operation of the device 10 and, at the same time, it is not necessary to employ a high operating potential from the B+ source, since this equivalent variational load has a relatively small voltage drop.

The connection from the cathode 30 to the oscillator circuit comprising the devices 36 and 38 offers a low impedance to the oscillator circuit. The oscillator circuit therefore does not present a heavy load to the source of modulating signal voltage from the D. C. amplifier. Also, the low impedance makes the circuit less susceptible to spray capacity which ordinarily may affect the operation of the circuit. Heretofore when series D. C. amplifiers have been used to attain compensation for operational voltage variations, additional cathode follower amplifiers have been employed to provide a low impedance source for the oscillator circuit.

It is seen that the device 26 and its associated circuitry has provided a high impedance load for the device 10 thereby providing good linearity. At the same time, the device 26 and its circuitry provides a low impedance source of modulating signals for the oscillator circuit. The double function of the circuit is attained without disturbing to any great degree the compensation for operational voltage changes which is usually attainable through the use of a pair of serially connected amplifier devices.

The oscillator circuit shown comprises a type of multivibrator circuit. In this circuit, which has been known and used heretofore, the grids 44 and 50 are biased positively with respect with the cathodes 42 and 48, respectively. The positive potential for the grids is attained from the cathode 30 of the device 26 which is at positive potential with respect to ground. It has been found that if a varying positive signal be supplied to the grids in a multivibrator, as shown, that the frequency of oscillations produced by the oscillator circuit is substantially linear and dependent upon the magnitude of the signal voltage.

When a signal voltage from a pickup is applied to the input terminals 18 and 20, it is amplified and applied to the multivibrator circuit from the cathode 30.

The devices 36 and 38 of the multivibrator circuit have their anodes 40 and 46 connected to B+ through resistors 56 and 58, respectively. The control grids 44 and 50 are respectively connected, through the capacitors 60 and 63 to the anodes 46 and 40. The grid leak resistors 52 and 54 are connected between the control grids 44 and 50, respectively, and the cathode 30 which is at positive potential.

During operation of the multivibrator circuit, the voltages impressed upon the two control grids 44 and 50 become periodically of such values that the anode current is interrupted, or blocked, the blocking occurring in the devices 36 and 38 alternately. The negative charge accumulates on the capacitor connected between a given control grid and the anode of the opposite electron discharge device at a given period in the cycle of operation and which is sufficiently great to block the corresponding electron discharge device, then leaks off in accordance with an exponential law until anode current begins again to flow, or until the cut-off point of the control grid is reached. The blocking condition is then removed and the corresponding electron discharge device becomes conductive. The operation of such multivibrators are known in the art.

A relatively square wave output voltage appears at the anode 46. The frequency of the square wave varies in accordance with the positive potential applied to the control grids 44 and 50 from the cathode 30. Thus it is seen that an input signal voltage at the terminals 18 and 20 is utilized to frequency modulate the oscillator frequency of the multivibrator circuit.

The output voltage from the multivibrator circuit is applied to a low pass filter 62 which removes the harmonics from the square wave output voltage of the multivibrator circuit and passes an essentially pure sine wave signal voltage of the same frequency to the output terminals 70 and 72. This sine wave signal may be used to frequency modulate a transmitted carrier signal which is transmitted to a receiving station.

The arrangement shown also provides means for compensation for B+ variations which tend to affect the operation of the multivibration circuit. The D. C. amplifier devices act as a divider to compensate the multivibrator for frequency variations caused by changes in B+ voltage. A decrease in B+ tends to increase the multivibrator oscillating frequency. The resistive divider effect of the D. C. amplifier modulator applies a decreased voltage to multivibration grid resistors thereby decreasing oscillating frequency to compensate for the decrease in the B+ voltage. An increase in the B+ voltage tends to decrease the multivibrator oscillator frequency. An increased voltage from the D. C. series amplifier applied to the grids of the multivibrator devices counteracts the tendency of the multivibrator to decrease in frequency.

It is noted that the present circuit also provides means for compensating for variations in ambient temperature when such variations affect the operation of the amplifier devices. In many telemetering systems, such compensation for ambient temperature variations is highly desirable.

It is noted that it is not necessary that the conditions for optimum oscillator modulator stability and linearity be coincident with the condition for best filament or heater balance. A feature of the present invention includes the resistor 33 connected between B+ and the cathode 14. This resistor provides an essentially independent control for the linearity of the multivibrator while having only a small effect on heater balance which is attained through the proper choice of cathode resistors 24 and 34. The resistor 33 may be moved over a range from the optimum value to provide a frequency adjustment for the multivibrator without appreciably affecting its operating characteristics. In some cases, the resistor 33 may be omitted without affecting the operation of the circuit to any great extent.

Thus it is seen that the present invention has provided an improved oscillator modulator circuit having compensation for both A. C. and D. C. heater and B+ operational voltage variations utilizing a minimum number of parts. A low impedance input source has been provided for the oscillator circuit. Means substantially independent of the temperature compensation means have been provided for linearity of the oscillator.

Various other types of voltage controlled oscillators may be employed in the place of the multivibrator type of oscillator illustrated. Modified Hartley, Colpitts and numerous other types of oscillator circuits may be employed.

The present invention has been illustrated with triode vacuum devices. It is recognized that pentodes as well as numerous other types of amplifier devices may be employed in place of the triode devices shown.

What is claimed is:

In combination with a multivibrator circuit, adapted to be linearly modulated by a source of modulating signals, a direct current voltage amplifier, said amplifier comprising a first electron discharge device including an anode, a cathode and a control grid, a resistor connected between said cathode and a point of reference potential, means for applying said modulating signals to said control grid, means for compensating for variations in filament voltages associated with said amplifier, said last-named means including a second electron discharge device having its space current path serially connected with the space current path of said first electron discharge device, said second electron discharge device providing a relatively high output impedance for said first electron discharge device, said second electron discharge device including an anode, a cathode and a control grid, a second resistor connected between said cathode of said second electron discharge device and said anode of said first electron discharge device, means connecting said control grid of said second electron discharge device to said anode of said first electron discharge device, means connecting said cathode of said second electron discharge device to said multivibrator circuit to provide a relatively low impedance for said multivibrator circuit, means for applying operating potentials to said first electron discharge device, said second electron discharge device and said multivibrator circuit, and a third resistor for varying the linearity characteristics of said direct current amplifier connected between said means for applying operating potentials and said cathode of said first electron discharge device, said third resistor also providing additional compensating means for variations in the operating potentials of said first and second electron discharge devices.

References Cited in the file of this patent

UNITED STATES PATENTS

| | | |
|---|---|---|
| 2,438,960 | Blitz | Apr. 6, 1948 |
| 2,516,135 | Moore | July 25, 1950 |
| 2,588,742 | McCallum | Mar. 11, 1952 |
| 2,592,572 | Jennings | Apr. 15, 1952 |

OTHER REFERENCES

Pub. I, Radiotron Designer's Handbook, Langford-Smith, 4th ed., published 1953, reproduced by Radio Corporation of America, Harrison, New Jersey, February 1954, pp. 487.